A. Pease.
Rotary Steam Engine.
No. 85. Reissued Sep. 5, 1846.
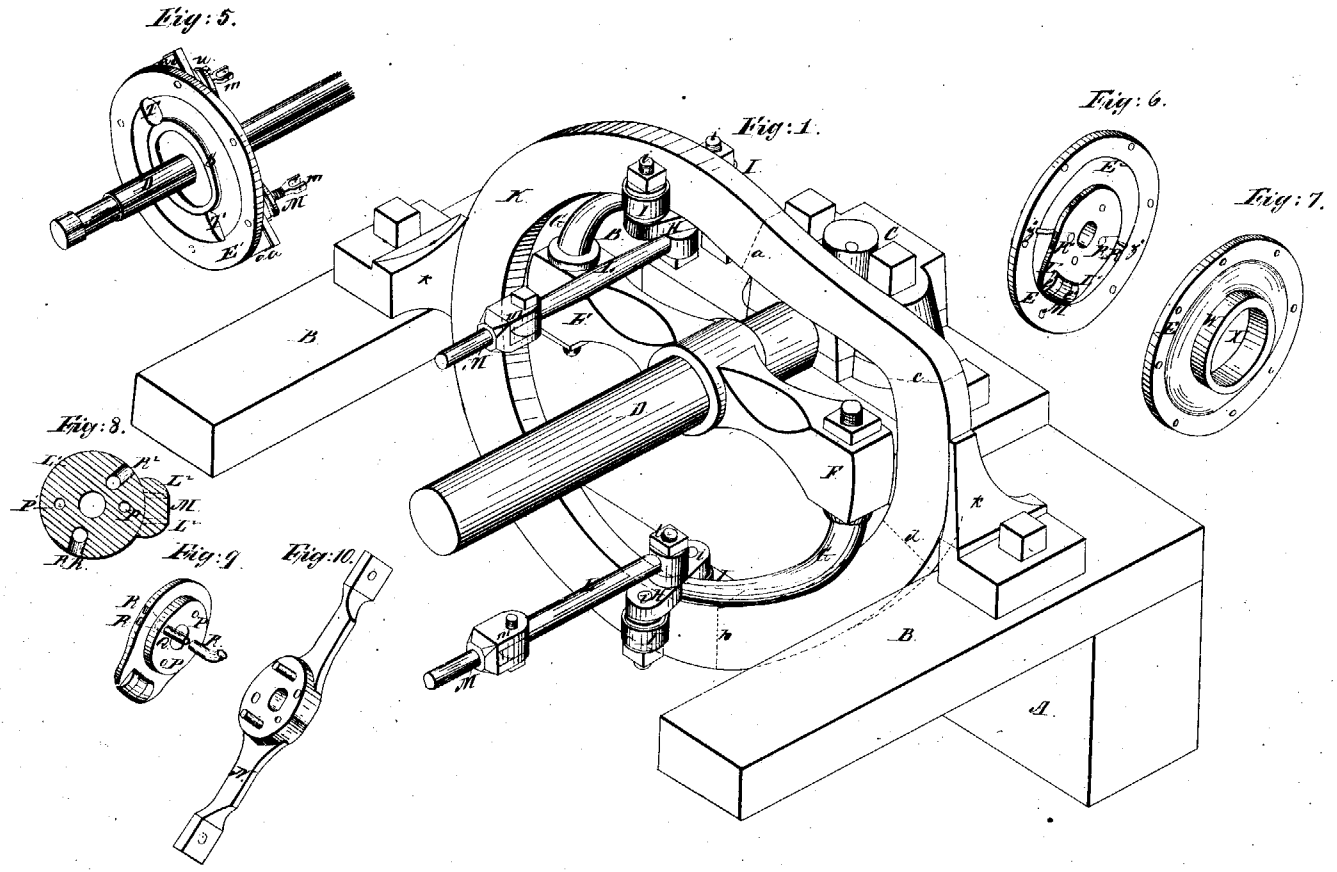
N. PETERS. PHOTO-LITHOGRAPHER, WASHINGTON, D.C.

UNITED STATES PATENT OFFICE.

ABRAM PEASE, OF LYONS, NEW YORK.

IMPROVEMENT IN ROTARY STEAM-ENGINES.

Specification forming part of Letters Patent No. 3,429, dated February 12, 1844; Reissue No. 85, dated September 5, 1846.

*To all whom it may concern:*

Be it known that I, ABRAM PEASE, of Lyons, in the county of Wayne and State of New York, have made certain new and useful Improvements in the Manner of Constructing the Rotary Steam-Engine; and I do hereby declare that the following is a full and exact description thereof.

In its general construction my rotary engine resembles others that have been previously made; but I have devised such improvements in the particular manner of arranging certain parts thereof as to render it more efficient in action than any other with which I am acquainted.

The steam-chamber of my engine, which corresponds with the steam-cylinder of the reciprocating engine, is annular, and in its cross-section presents a hollow cylindrical cavity into which the steam is to be admitted. This, with its immediate appendages, constitutes a rotary wheel, which is firmly affixed to and is to revolve with a shaft, the gudgeons of which are sustained on suitable boxes. On this shaft there is also affixed arms that revolve with it, and carry friction-wheels that embrace a stationary guide-wheel attached to the frame of the machine, and which is so formed as to enable it to cause the valves to slide back and forth, which are to serve as steam-stops in the revolving cylinder.

In the accompanying drawings, Figure 1 is a representation in isometric perspective, on an enlarged scale, of the guide-wheel or curved rim which governs the motion of the valves; also of certain parts, to be presently described, which aid in its operation. Fig. 2 is a perspective view of the engine complete. Fig. 3 is an edge view of the guide-wheel, and Fig. 4 a side view thereof. Figs. 5, 6, and 7 are different views of the revolving cylinder. Figs. 8 and 9 show the piston and the stationary plate around which the steam-cylinder revolves; and Fig. 10 is a cross-beam that sustains the piston, and is made fast to the framework of the engine.

In each of these figures where the same parts occur they are designated by the same letters of reference.

A A, Figs. 1 and 2, represent sleepers on which may be fastened the frame B that sustains the engine.

C C, Figs. 1 and 2, are boxes that receive the gudgeons of the main shaft D. Near to one end of this shaft is affixed the revolving steam-cylinder E. The particular arrangement of the appurtenances of this rotary cylinder, with its piston, steamways, and other appendages, will be presently shown. Near to the opposite end of the shaft D from that which carries the cylinder are affixed arms F F, Fig. 1, that stand out at right angles from it. These arms are usually two in number, that being the number of slide-valves that I prefer to use.

K is a curved rim or guide-wheel, which is firmly attached to the frame of the engine by means of screw-bolts passing through the ears *k*. The rim K is on its periphery a segment of a cylinder, and is equidistant from the axis D; but the rim is so curved laterally as to cause the slide-valves to move back and forth to the required distance. For this purpose the arms K carry guide-heads H, furnished with friction-rollers I I that embrace the rim K. The heads H are attached to curved arms G G, that swivel in the revolving arms F F, so as to enable the heads H to conform to the lateral curvature of the guide-rim K. The friction-rollers I I turn on pivots *i i*, that pass through the heads H H. An end view of this part is given in Fig. 4. The guide-rim K for more than half its circumference stands in a vertical plane, as the slide-valves are not to move in or out during more than one-half of their revolution; but the remaining portion is curved, so as to recede from the revolving cylinder. This is shown in Fig. 1 and in the edge view of the rim K, Fig. 3. The curving out commences at the points *a* and *b* and continues to the points *c* and *d*, and between these points it may again assume a vertical direction, or, if preferred, may be slightly curved. The deviation of the curved part must be somewhat greater than the diameter of the steam-chamber.

L, Figs. 1 and 2, are the connecting-rods of the sliding valves, of which M are the stems.

These are connected together by the joint *m*. From the boxes H rise pins *l*, Fig. 1, that pass through the outer ends of the rods L, and communicate to them the required motion. The above-described combination constitutes my first improvement.

I will now proceed to describe more particularly the manner of constructing and arranging the parts constituting the steam-cylinder, the piston, the steamways and their immediate appendages, together with the manner in which they operate.

The steam-cylinder is cast in two parts. (Shown in Figs. 5 and 6.) The part E′, Fig. 5, is made fast to the shaft D. To the part E′ the part E, Fig. 6, is to be attached by screw-bolts passing through their flanges, and when so united, with the piston in place, the steam-chamber is completed, one-half of said chamber being formed in each plate of the steam-wheel, as in many other rotary engines.

In Fig. 7 I have represented the outer side of the plate E, which is cast with an opening, X, in its center, for a purpose to be now described.

Figs. 8 and 9 show the plate or disk L′, through which passes the steamway and to which the piston M′ is attached, Fig. 8 being a section through the middle thereof, and Fig. 9 a perspective view of it. The plate L′ is embraced between the inner portion of the steam-cylinder plates E E′, these plates being in that part a sufficient distance apart to admit said plate, which is a perfect circle, with the exception of the projections or jaws L″ L″, between which the piston M′ is contained in such manner as merely to be held in place, while it is free to adapt itself to any slight variation in the steam-cylinder. The periphery of said plate constitutes a part of the annular steam-chamber, but does not revolve with it. The piston M′ is cylindrical, and projects out on each side of said plate, so as to fill the steam-chamber completely. The part Q on the plate L′ is a circular projection that passes into the circular opening X in the plate E, Fig. 7. The plate L′ and its piston are held in place and rendered stationary by means of the beam or bar N, Fig. 10, which is made fast to the side pieces of the frame B, as shown in Fig. 2. The circular projection O, Fig. 10, enters the opening X, which it fits accurately, and by means of the rim W, Fig. 7, said opening is rendered sufficiently deep to receive it and likewise the circular projection Q on the plate L′. The bolts P P on the projection O enter corresponding holes, P′ P′, on the projection Q, and hold the plate L′ firmly. Packing-rings, one of which is shown at S′, Fig. 5, may be let into grooves in the plates E E′, and the pressure of them may be regulated by set-screws, and may bear upon elastic packing, as in some other rotary engines.

T T′, Fig. 5, are the sliding valves, that are withdrawn as they approach the piston M′.

*u u* are stuffing-boxes for the stems of the valves, and *a a* are the lateral chambers that receive the valves. One of these is distinctly shown in Fig. 2. The piston M′ has elastic packing similar to that ordinarily used, which is compressed between the metallic heads *e′ e″*.

In Fig. 6, *z′ z″* are grooves cut into the semi-cylinder of the plate E to receive the ends of the valves T T′, that slide through mortises in the plate E′, these grooves enabling them the more perfectly to stop the steam. In this Fig. 6 the plate L′ and the piston M′ are represented as occupying their proper place in that section of the steam-wheel. The induction and eduction steam-passages pass through the projecting plate Q, Fig. 8, into the body of the plate L′, and through the edge of said plate, as indicated at R R in this figure and at R″ in Fig. 6, the opposite sides of the plate L′ being shown in these figures.

Fig. 9 is a section through the middle of the plane of the plate L′, showing the passages R R and R″ leading to its periphery.

R′, Fig. 9, is the induction-pipe, which communicates with the opening R″ in the periphery of L′, and R the eduction-pipe that communicates with the openings R R in said periphery. These openings in the periphery extend longitudinally, as represented, their length considerably transcending the thickness of the sliding valves, as it is intended that steam shall flow through them on each side of said valves, so that they may be enabled to slide back and forth under an equal (or nearly equal) pressure of steam on each of their sides, the arrangement of the valves and openings being such as to effect this object. Let, for example, the piston M′, Fig. 6, the induction-opening R″, and the eduction-opening R R be in the position as related to the place of the valve-seats *z′ z″*. The cylinder has been carried to its present position by the reaction of the steam against a closed valve at *z″* and the head *e′* of the piston, the steam between said valve and head *e″* having been discharged by the exhaust-openings. The valve at *z′* closes the instant it has passed the eduction-opening R″, and consequently while the steam is equally dense on both sides of it, and it then acts between the said valve and head *e′*, the eduction-opening R R at the same instant being passed by the closed valve at *z″*, and the steam is exhausted in the cylinder-space E″ between the valves *z″* and *z′*. The valve at *z″* then opens to allow the cylinder to pass the piston M′, said opening taking place while the pressure is removed from each side of the valve at *z″*.

Having thus fully described the construction and operation of my improved rotary steam-engine, what I claim therein as new, and desire to secure by Letters Patent, is—

1. The method herein set forth of governing the connecting-rods L, which operate the slide-valves by attaching said rods to the curved arms G, that are connected with and swivel in the arms F, in combination with the curved rim K, the same being constructed and operating substantially in the manner herein set forth.

2. The arrangement of the elongated steam and exhaust passages in the plate or disk to which the piston is attached, when combined with the arrangement of the valves and the periods of their motions, so as to cause them to establish an equilibrium (or nearly so) of the pressure on each of the sides of the valves prior to and during their motions, substantially as described.

ABRAM PEASE.

Witnesses:
THOS. P. JONES,
EDWIN L. BRUNDAGE.